Patented Nov. 19, 1946

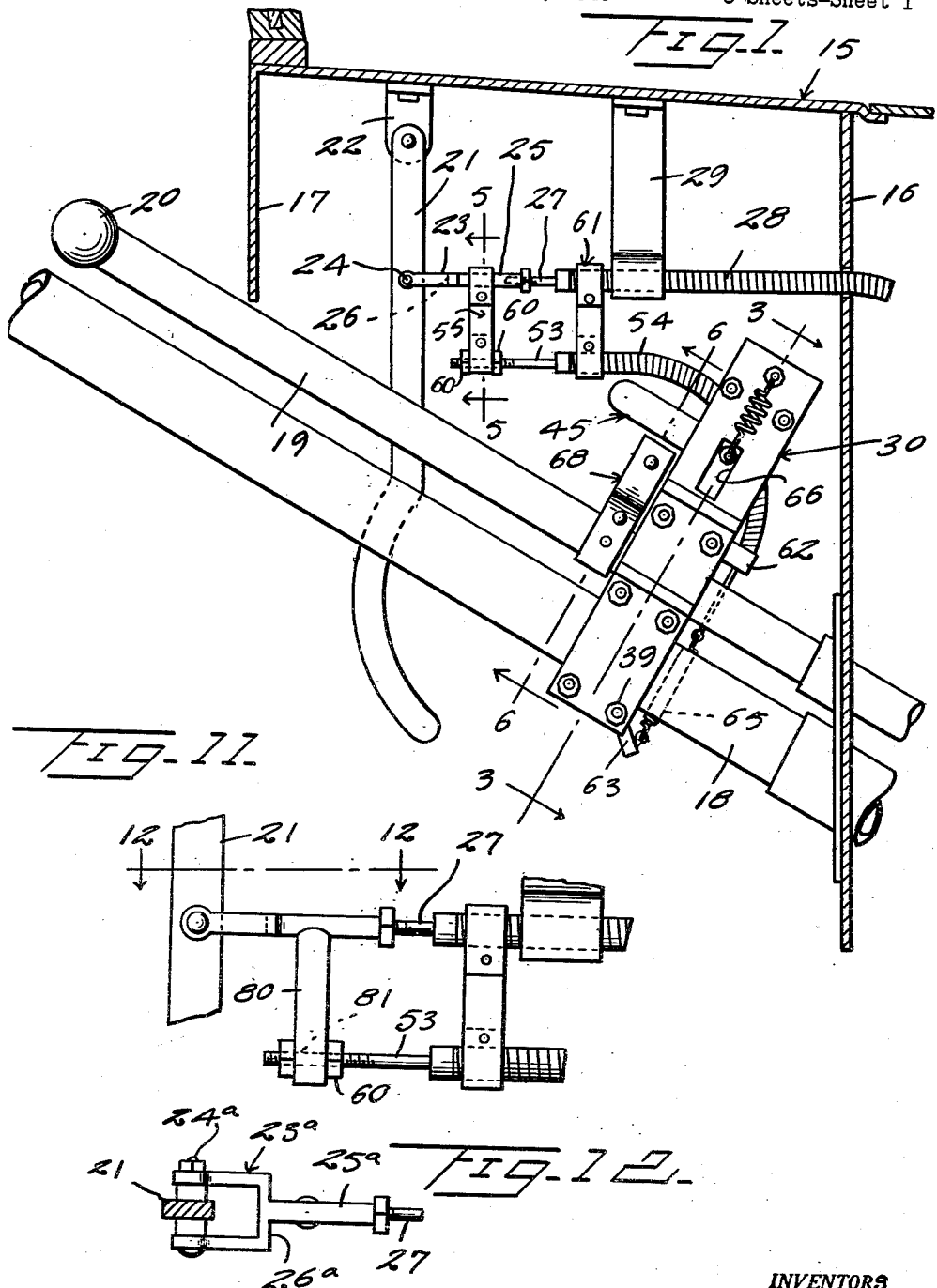

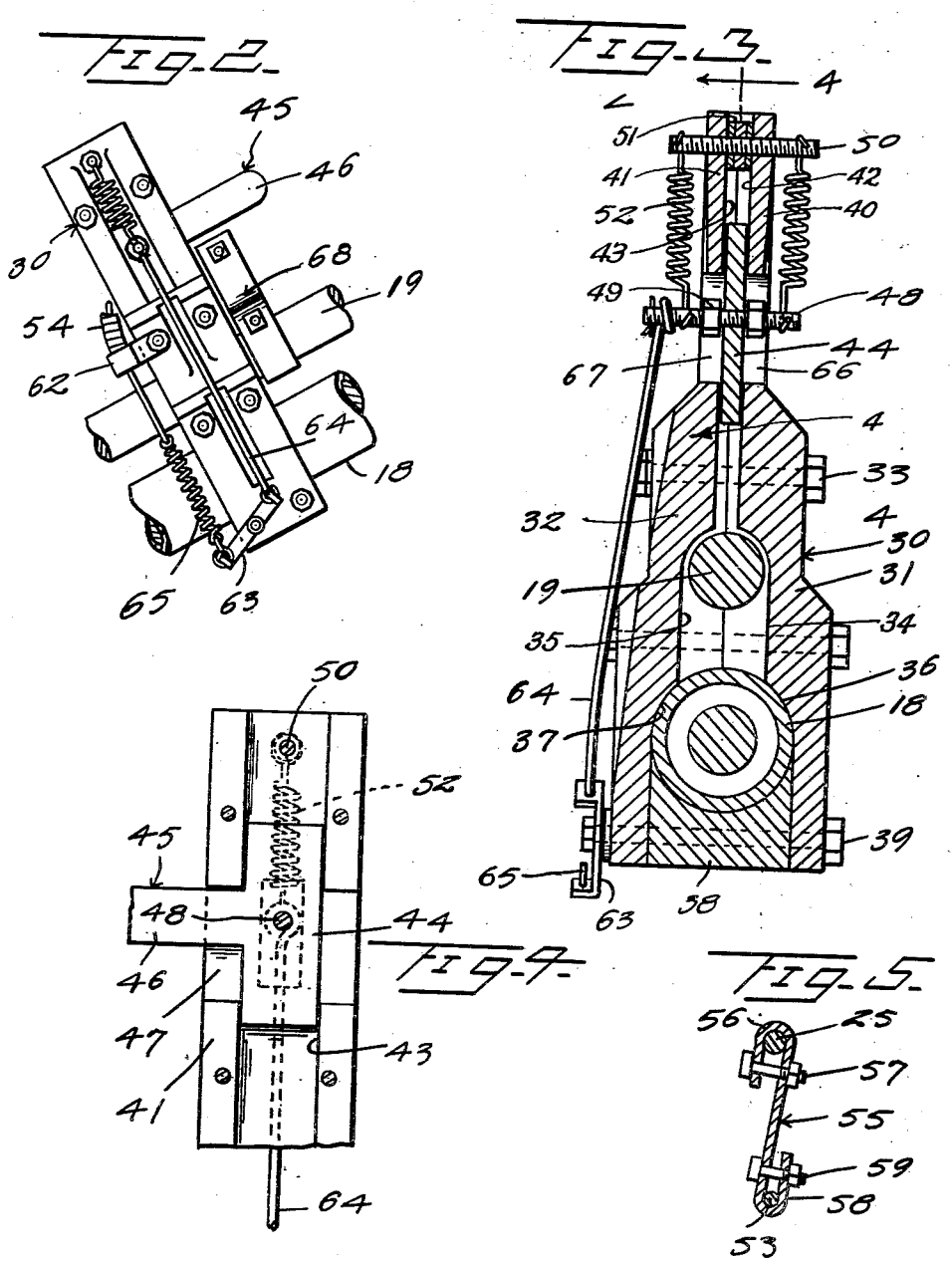

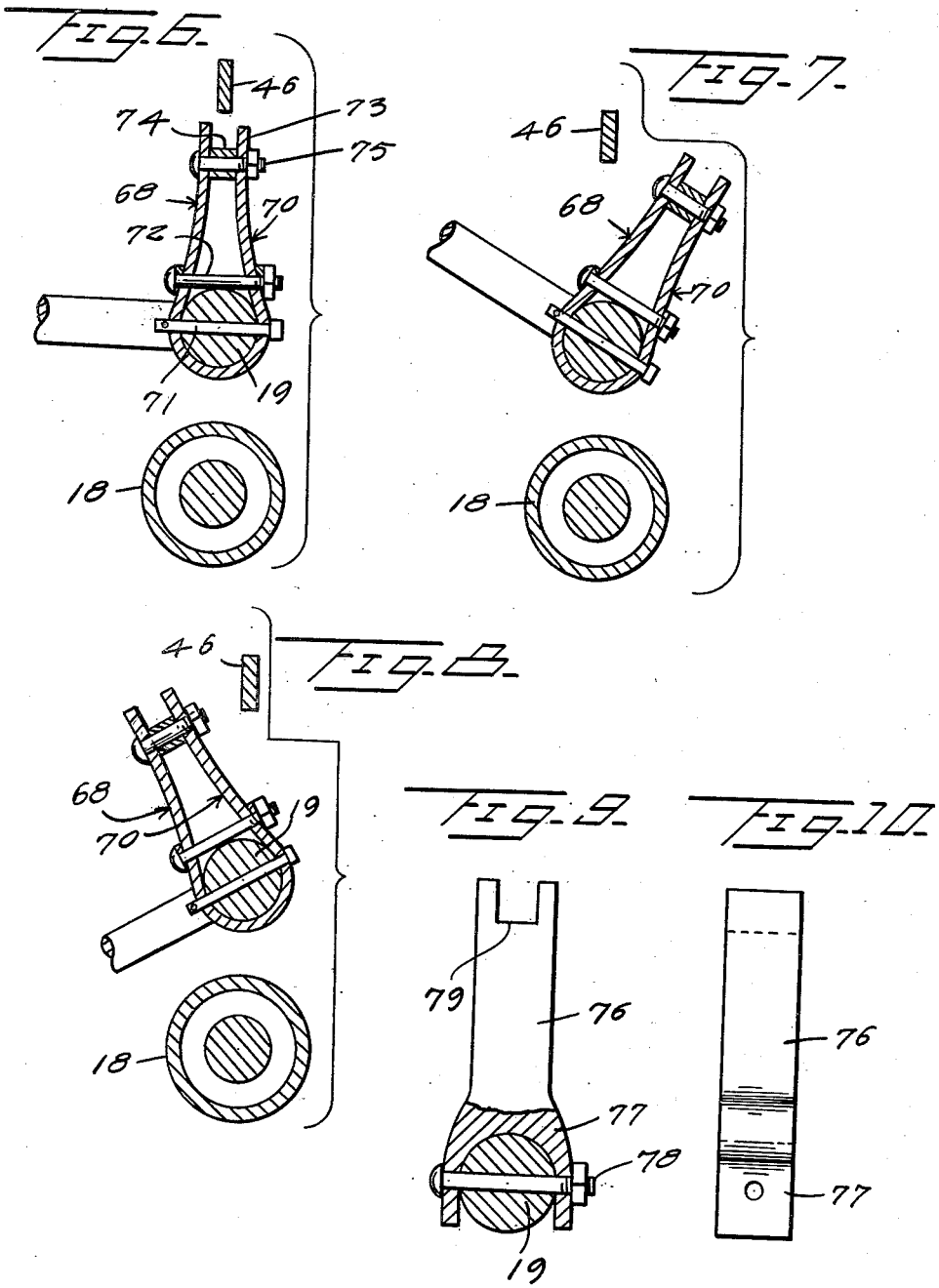

2,411,455

UNITED STATES PATENT OFFICE 2,411,455

GEARSHIFT LOCKING DEVICE

William H. Mullins and William M. Gentry,
South Boston, Va.

Application June 8, 1945, Serial No. 598,306

10 Claims. (Cl. 192—4)

This invention relates to a safety lock for vehicle transmissions.

An object of this invention is to provide in combination with a vehicle gear shifting structure, means operable by movement of the hand brake to braking position for locking the gear shifting structure in any selected position so that the operator of the vehicle will not be able to change the gears until the hand brake has been released.

Another object of this invention is to provide a safety lock for the gear shift mechanism of a vehicle which will automatically lock the gear shift mechanism so that the driver of the vehicle will be unable to properly operate the vehicle until the hand brake has been released.

In the operation of a vehicle it is not infrequent that the driver forgets to release the hand brake and if the latter is not set hard the vehicle may be operated with the hand brake set, resulting in undue wear or damage to the hand brake or other parts. The present invention provides a means whereby the gear shifting mechanism may be locked in either neutral or any engaged gear position so that the driver, in order to efficiently operate the vehicle, will be required to release the hand brake.

A further object of this invention is to provide a gear shift lock of this kind which may be made as an attachment for various types of vehicles.

This invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a fragmentary side elevation, partly in vertical section of a vehicle, having a transmission lock mounted thereon constructed according to an embodiment of this invention, Figure 2 is a detailed side elevation partly broken away and in section similar to Figure 1 but showing the opposite side of the device, Figure 3 is a sectional view taken on the line 3—3 of Figure 1, Figure 4 is a fragmentary sectional view taken on the line 4—4 of Figure 3, Figure 5 is a sectional view taken on the line 5—5 of Figure 1, Figure 6 is a fragmentary sectional view of the device taken on the line 6—6 of Figure 1, showing the gear shifting rod in neutral position with the locking bolt disengaged therefrom, Figure 7 is a view similar to Figure 6 but showing the keeper in a lateral position with respect to the locking bolt, Figure 8 is a sectional view similar to Figure 7 but showing the keeper in an opposite lateral position, Figure 9 is a transverse sectional view of the gear shifting rod having a modified form of keeper mounted thereon, Figure 10 is a detailed side elevation of the keeper shown in Figure 9, Figure 11 is a detailed side elevation partly broken away of a modified form of connector between the hand brake operator and the bolt lock operator, Figure 12 is a sectional view taken on the line 12—12 of Figure 11.

Referring to the drawings, the numeral 15 designates generally a vehicle body including a dashboard 16 and an instrument board 17 which is spaced from the dashboard 16. A steering column 18 extends downwardly through the dashboard 16 and is connected in the conventional manner to the steering mechanism. A gear shifting rod 19 is disposed in spaced parallel relation with respect to the steering column 18 and has a handle or operator 20 mounted on the upper or rear end thereof. The rod 19 is connected to the transmission and is adapted to have both endwise and rotary movement in the normal manner to effect a gear change in the transmission. The vehicle body 15 also includes a hand brake or lever operator 21 carried by a hanger 22. It will be understood that the operator 21 may also include a pawl and ratchet means (not shown) for releasably holding the lever or operator 21 in selected operative braking position or inoperative position. The lever 21 has connected thereto a U-shaped member 23 which has the parallel arms thereof pivotally mounted on a bolt 24, extending through the lever 21. A stem 25 extends from the bight 26 of the U-shaped member 23 and has secured thereto the rear end of a hand brake adjusting rod 27. The rod 27 is of flexible construction, extending through a sheath 28 which is supported by a hanger 29.

In order to provide a means whereby the operator of the vehicle will be unable to effect a gear change in the event the hand brake lever 21 is in braking position, we have provided an attachment which is mounted on the steering column 18 and operatively associated with the gear shift rod 19 and the brake lever 21. This attachment includes a housing generally designated as 30 which is fixedly mounted on the steering column 18. The housing 30 includes a pair of plates 31 and 32 which are secured together by fastening members 33.

The plates 31 and 32 are provided with cutouts 34 and 35 respectively, within which the gear shifting rod 19 is adapted to loosely engage. The plates 31 and 32 are also formed with complementary cutouts 36 and 37 respectively, within which the steering column 18 engages. A clamping or spacer block 38 is interposed between the lower ends of the plates 31 and 32 and a pair of clamping bolts 39 engage through the plates 31 and 32, so as to tightly clamp the housing 30 with respect to the steering cloumn 18. The plates 31 and 32 are each formed with extensions 40 and 41 respectively, which are formed in their inner confronting sides with longitudinal recesses 42 and 43, forming a guide channel within which the head 44 of a lock bolt generally designated as 45 is adapted to slidably engage.

The locking bolt 45 also includes a laterally projecting bolt member 46 which extends laterally of the extensions 40 and 41 through a lateral slot 47 formed in the adjacent portions of the extensions 40 and 41. A bolt or pin 48 is extended transversely through the head or slide member 44, being tightly secured with respect to the head or slide member 44 by means of a pair of lock nuts 49. An upper bolt 50 is extended transversely through the extensions 40 and 41, being firmly locked by locking members 51. A pair of springs 52 are disposed on the outside of the extensions 40 and 41, being secured at their upper or outer ends to the adjacent ends of the bolt 50 and secured at their inner ends to the bolt or pin 48.

The springs 52 provide a means whereby bolt 45 will be normally urged to an upper released position. In order to provide for movement of bolt 45 to an inner locking position, I have provided a flexible connector 53. The connector 53 is extended through a sheath 54 which is held in spaced relation to the sheath 28 by means of a supporting strap 61.

The strap 55, as shown in Figure 5, is provided with a reverted end 56 engaging about the stem 25 and tightly secured with respect thereto by means of a clamping bolt 57. The opposite end of the strap 55 is bent as at 58, reversely from the bent portion 56, engaging about the flexible member 53 and tightly secured with respect thereto by means of a clamping bolt 59. A pair of adjusting nuts 60 are threaded on to the flexible member 53 and engage on opposite edges of the reverted clamping member 58 so that the connecting member 55 may be endwise adjusted. A second supporting strap 61, similar to the strap 55, is secured at one end about the sheath 28 and at the other end about the sheath 54, for supporting the sheath 54 in spaced relation with respect to the sheath 28 and for providing for the movement of the extended portion of the flexible member 53 in parallel relation with respect to the brake adjusting member 27.

The opposite end of the sheath 54 is tightly secured with respect to the housing 30 by means of a strap or clamping member 62, which engages one of the fastening members 33, and preferably the clamping member 62 is positioned on the lower or forward edge of the housing 30. The flexible member 53 extends outwardly and downwardly from the lower end of the sheath 54. A rock lever 63 is pivoted between the ends thereof on a bolt 39, and one end of the lever 63 has secured thereto one end of a link 64. The opposite end of the link 64 is secured to the pin or bolt 48. A spring 65 interposed between flexible member 53 and rock lever 63 provides a cushioning means and a bolt tensioning means whereby the sliding movement of the bolt 45 may be less than the rocking movement of the lever 63 in order that the brake operating lever 21 may be rocked to full braking position without being retarded by the sliding movement of the transmission locking bolt 45. The pin or bolt 48 extends loosely through a pair of elongated slots 66 and 67 which are formed in the extensions 40 and 41 respectively.

A keeper generally designated as 68 is fixedly secured to the gear shifting rod 19 in a position for engagement with the bolt 45. The keeper 68, as shown in Figures 6, 7 and 8, is formed of a strap 70 which is bent upon itself and secured to the gear shifting rod 19 by means of a pin 71. A clamping bolt 72 is extended through the open ends of the strap 70 adjacent the rod 19 so as to provide a pair of spaced apart arms 73. The arms 73 are held in spaced apart relation by means of a spacer 74 and a bolt 75, extending through the arms 73 and the spacer 74. The space between the arms 73 is sufficient to admit the bolt member 46, engaging therebetween when the gear shifting rod is in neutral position. In Figure 6 the bolt member 46 is in released position and is therefore spaced from the ends of the keeper arms 73 so that the gear shifting rod 19 may be rocked to any selected gear position.

Referring now to Figure 7, the keeper 68 is disposed in a lateral position to the right of the bolt member 46 with the latter in locking position. In locking position the bolt member 46 is disposed in the path of the swinging of the keeper 68 so that this keeper cannot be swung to the left, as viewed in Figure 7, to effect a different gear engagement until the hand brake lever 21 has been moved to a brake releasing position. In Figure 7 the keeper 68 is disposed to the left of the bolt 46 and the latter is in a locking position so that the gear shifting rod 19 cannot be rotated clockwise to effect a different gear change until the hand brake lever 21 is released.

Referring now to Figures 9 and 10, there is disclosed a modified form of keeper which is constructed in the form of an elongated bar 76, having a fork 77 at its inner end within which the gear shifting rod 19 is adapted to engage. A clamping bolt 76 extends through the arms 77 and the rod 19 so as to hold the bar 76 against movement with respect to the rod 19. The bar 76 is formed at its outer end with a keeper recess 79 within which the bolt member 46 is adapted to engage when the latter is in locking position. It will be understood that the bolt structure and operative means therefor, hereinbefore described, will be associated with the keeper in Figures 9 and 10.

Referring now to Figures 11 and 12, there is disclosed a modified form of connection between the brake adjusting member 27 and the bolt operating member 53. The brake adjusting lever 21 has pivotally secured thereto a U-shaped member 23a which is mounted on a bolt 24a, extending through the lever 21. The U-shaped member 23a has a stem 25a extending from the bight 26a thereof, and the stem 25a has fixedly secured thereto and extending at right angles therefrom, a bar 80. The bar 80 is formed with an opening 81 within which the adjacent end of the bolt operating member 53 is adapted to engage, and nuts 60 which are threaded on the operating member 53 engage on opposite sides of the bar 80 so as to tightly secure the bolt operating member 53 in adjusting position with respect to the bar 80.

In the use and operation of this device, the housing 30 is tightly clamped on the steering column 18, the gear shifting rod 19 loosely engaging therethrough. The flexible bolt operating member 53 is fixed relative to the hand lever 21 by the strap 55. The keeper 68 is tightly clamped on the gear shifting rod 19 in a position whereby the rod 19 may have normal endwise movement for effecting gear change, and the bolt member 46 is of sufficient length that it will be disposed in a locking position with respect to the keeper 68 in any endwise position of the rod 19. During the normal operation of the vehicle, the hand brake lever 21 will be disposed in released position which is the position shown in Figure 1. In the released position of the brake lever 21, the bolt member 46 will be held in its uppermost released position by the springs 52. When the brake lever 21 is rocked to braking position, clamping member 55 will be moved to the left as viewed in Figure 1, and endwise movement of member 55 will also effect endwise movement of bolt operating member 53 in the same direction. As bolt operating member 53 is moved to the left, rock lever 63 will be rocked upwardly at its outer end and the opposite end of lever 63 will be rocked downwardly thereby pulling bolt member 46 downwardly to locking position. The spring 65 will provide a tensioning means for tensioning the bolt 45 in its locked position.

Assuming that gear shifting rod 19 is in neutral position, keeper 68 will be positioned with the arms 73 thereof confronting the bolt member 46 so that when lever 21 is pulled to a braking position, bolt member 46 will be moved downwardly between keeper arms 73. It will be obvious therefore that when the driver of the vehicle attempts to effect a gear change without releasing the hand brake, the gear change cannot be effected as rod 19 is held against rocking movement by means of the locked position of bolt member 46. When hand brake lever 21 is moved forwardly to released position, springs 52 will pull bolt member 45 upwardly and forwardly to keeper disengaging position, thereafter gear shifting rod 19 may be rocked to any selected position. In the event the gear shifting rod 19 is in a position where the gears of the transmission are engaged, the keeper 68 will be disposed in either of the positions shown in Figures 7 and 8. In these engaging positions of the rod 19, the keeper 68 will be disposed laterally of the bolt member 46. In effecting change of gears from the engaged position, it is necessary to rock the rod 19 in the opposite direction and this opposite rocking of rod 19 is prevented by reason of bolt member 46 being in locking position across the path of the swinging movement of keeper 68.

This device may be made as an attachment for a motor vehicle so that it can be mounted on the present parts of the vehicle or may be secured to the vehicle at the time of its original construction.

What is claimed is:

1. In combination, a movable hand brake operator a steering column, a rockable and endwise movable gear shift operator parallel to said column, a keeper fixed to said gear shift operator, a locking member supported on said column for holding said gear shift operator against rotary movement, means constantly urging said locking member to released position, and means connected to said hand brake operator and said locking member whereby the latter will be moved to locking position when said hand brake operator is moved to braking position.

2. The combination set forth in claim 1 wherein said latter named means includes an elongated flexible member.

3. As a new article of manufacture, a locking means for connection to a hand brake and for locking a gear shifting rod disposed parallel with a steering column, said locking means comprising a keeper, means securing said keeper on said rod, a locking bolt, means adapted to be fixed relative to said column supporting said bolt for movement relative to said keeper, spring means constantly urging said bolt to released position, and means connecting said bolt with said hand brake whereby said bolt will be moved to locking position when said hand brake is moved to braking position.

4. A device as set forth in claim 3 wherein said latter mentioned means includes a spring whereby said locking bolt will be placed under tension when in locking position.

5. In combination, a movable hand brake operator for a vehicle, a steering column, a gear shifting rod disposed parallel with said column, a keeper fixed to said rod, a locking bolt for engagement with said keeper for holding said rod against rotation, means fixed relative to said column movably supporting said bolt, and means connecting said bolt with said hand brake operator for effecting movement of said bolt to locking position when said hand brake operator is moved to braking position.

6. In a vehicle having a steering column, a gear shifting rod parallel with said column, and a movable hand brake operator, a lock bolt, means supporting said bolt from said column, a keeper fixed to said rod in a position for engagement with said bolt when the latter is moved to locking position, and means connected to said bolt and said hand brake operator for moving said bolt to locking position when said hand brake operator is moved to braking position.

7. In a vehicle as set forth in claim 6 including a resilient element interposed in said latter means whereby said bolt will be resiliently held in locked position.

8. A locking attachment for locking the gear shift rod mounted parallel with the steering column of a vehicle when the hand brake operator is in braking position, comprising a housing adapted to be fixed on the steering column and loosely engage about said rod, a locking bolt slidably carried by said housing and projecting laterally therefrom, a keeper adapted to be fixed to said rod in a position for engagement with said bolt when the latter is in locking position, and a flexible member connecting said hand brake operator with said bolt for moving the latter to locking position when said hand brake operator is in braking position.

9. A locking attachment as set forth in claim 8 including a rock lever carried by said housing and connected to said bolt and said flexible member.

10. A locking attachment as set forth in claim 8 including a rock lever carried by said housing and connected at one end thereof to said bolt and a resilient connection between the opposite end of said lever and said flexible member.

WILLIAM H. MULLINS.
WILLIAM M. GENTRY.